June 6, 1950     P. CUSHING     2,510,381
FREQUENCY METER
Filed April 21, 1947
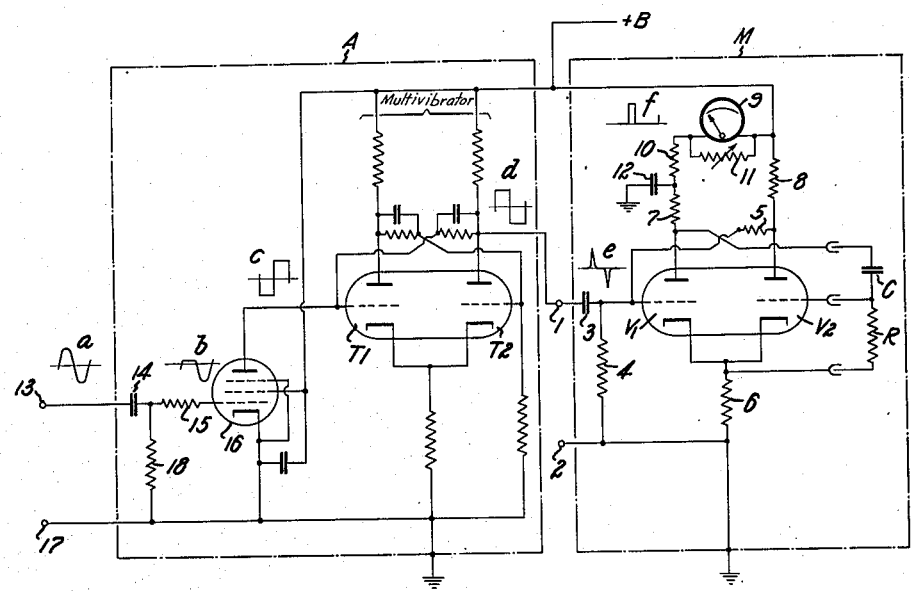
Inventor:
Philbrook Cushing,
By Pierce, Scheffler + Parker,
Attorneys.

Patented June 6, 1950

2,510,381

UNITED STATES PATENT OFFICE 2,510,381

FREQUENCY METER

Philbrook Cushing, Morristown, N. J., assignor to Aircraft Radio Corporation, Boonton, N. J., a corporation of New Jersey Application April 21, 1947, Serial No. 742,825

2 Claims. (Cl. 175—368)

This invention relates to frequency meters and more particularly to electronic frequency meters for measuring and directly indicating the frequency of electrical oscillations and/or cyclically repeated voltage pulses.

Objects of the invention are to provide electronic frequency meters of simple construction which are characterized by permanency of calibration, independence of variations in the amplitude of the input voltage, low power requirements, and independence of fluctuations in line voltage when the meter is energized from the conventional power and light circuits. A further object is to provide an electronic frequency meter including thermionic tube circuits and a direct current milliammeter, and in which the milliammeter current is automatically limited by the vacuum tube circuits to prevent damage to the instrument.

These and other objects and the advantages of the invention will be apparent from the following specification when taken with the accompanying drawings in which the single view is a circuit diagram of an electronic frequency meter embodying the invention, curves indicating the wave forms at different points being added to the circuit diagram.

In the diagram, the various circuit elements are shown as enclosed within two broken line rectangles A and M respectively; the elements within the rectangle A being auxiliary circuits for developing a square voltage wave from a cyclically varying voltage of arbitrary wave form, and the elements within the rectangle M comprising the novel electronic frequency meter. The auxiliary circuits within the rectangle A are not required in some applications of the frequency meter, but auxiliary circuits are illustrated as they may be included in commercial embodiments which are adapted to measure the frequency of pulsating voltages and of alternating voltages of sine wave, square wave or other forms.

The auxiliary circuits will be described later, and the measuring apparatus will be first described on the assumption that an alternating voltage of square wave form, or approximately square wave form, is impressed across the input terminals 1, 2 of the frequency meter. Terminal 1 is connected to the grid of a triode V1 through a condenser 3, and the grounded terminal 2 is connected to the grid through a resistor 4; the condenser 3 and resistor 4 constituting a peaker for converting the square wave input to sharply peaked voltage pulses at the grid of the triode V1. A second triode V2 is cross-connected to the triode V1 to provide a "flip-flop" or single shot multivibrator circuit, and the triodes may be separate tubes or, as illustrated, may be the sections of a double triode, for example of the 6SN7 type. For generality and for convenience of description the triodes V1, V2 will be referred to in the specification as "tubes" but it is to be understood that such terms do not exclude the illustrated double-triode tube construction. The cross-connections include a resistor 5 connected between the grid of triode V1 and the plate of triode V2, and a condenser C connected between the plate of triode V1 and the grid of triode V2. A resistor R is connected between the grid of triode V2 and its cathode, and the cathodes of both triodes are connected to ground through a common cathode resistance 6. The anodes of the triodes V1, V2 are connected to a common source +B of anode potential through load resistors 7, 8 respectively. A measuring circuit, comprising a milliammeter 9 in series with a current-limiting resistor 10 and shunted by a variable sensitivity-adjusting resistor 11, is connected in series between the resistor 7 and the voltage source +B. The junction of resistors 7 and 10 is connected to ground through a condenser 12 which serves to reduce fluctuation of the pointer of instrument 9 at low frequencies.

The triode V2 is normally conductive, by virtue of its grid return to cathode through resistor R, and it maintains triode V1 in a cut-off state so long as no input signal is impressed upon the grid of triode V1. When a positive voltage impulse is applied to triode V1, sufficient to render it conductive, the triode V2 will be rendered non-conductive by the application to the grid of triode V2, through condenser C, of the negative impulse appearing on the anode of triode V1. The original resting charge on condenser C will flow off, however, through resistor R until the grid-cathode voltage of triode V2 rises to the point where triode V2 conducts sufficiently to cut off triode V1 again through resistors 5 and 4. Anode current of triode V1 flows through the milliammeter 9 during the interval when triode V2 is rendered non-conductive by the positive voltage pulse impressed upon the triode V1. The magnitude of this current is determined by the tube and circuit constants, and the interval during which it flows is determined by the values of condenser C and resistor R. Therefore, if a series of positive pulses is applied to the grid of triode V1, an average current flows through milliammeter 9 which is a linear function of the frequency of the positive pulses up to a frequency of such value that each charge on C does not leak off sufficiently to cause triode V2 to conduct before the next positive pulse reaches the grid of triode V1. At frequencies above this value, the current through the meter 9 remains constant. The meter movement is damped by its mechanical inertia and the filtering action of condenser 12, and the pointer assumes a steady position indicative of the average anode current of the normally non-conductive triode V1.

The measuring range may be varied by changing the value of the condenser C, of the resistor R, or both condenser C and resistor R; and the change in value may be effected by altering the magnitude of an adjustable condenser or resistance, or by substituting another condenser and/or resistance in the circuit. A switch system may be provided for changing the measuring range or, as illustrated, the condenser C and resistor R may be assembled as a unit to plug into the meter circuit; whereby various assemblies of condensers C and resistors R of different values may be interchangeably connected into the measuring circuit. The scale of milliammeter 9 may be graduated directly in values of frequency, and there may be a plurality of scales with graduations in different frequency ranges. It is preferred, however, to employ a single scale of graduations and to select the several values of C and R to provide decade-related frequency ranges.

An extended range of frequencies may be measured without change of the timing elements C and R by employing a milliammeter 9 which has a deflection proportional to the logarithm of the instrument current.

The auxiliary apparatus A for developing a voltage wave of square form from pulsating or alternating voltages of other forms has an input terminal 13 connected through a coupling condenser 14 and series grid resistor 15 to the grid of a limiting tube 16. The second input terminal 17 is connected to the cathode, which is grounded, and the tube is provided with a grid leak resistor 18. The series grid resistor 15 has a very high value compared to the grid-to-cathode resistance when grid current flows so that essentially the entire positive half cycle of input voltage is limited to the voltage level of the cathode. During the negative half cycle of input voltage, the grid potential is below cut-off. As a result of grid limiting and grid cut-off, the anode voltage of tube 16 is a substantially square wave. The anode of tube 16 is directly connected to the input grid of a multivibrator comprising triodes T1, T2, which may be separate tubes or preferably, as shown, may be housed in a single tube envelope. The purpose of the multivibrator is to improve the shape of the square voltage wave output from the voltage clipping tube 16. The circuit design of the multivibrator is conventional, and it is therefore believed that is is not necessary to describe the circuit connections of the triodes T1 and T2 in detail. The anode of triode T2 is directly connected to the input terminal of the frequency meter.

Assuming an input voltage across terminals 13, 17 of sine form, as shown by curve a, the input voltage wave is clipped to impose a positive voltage which is of substantially constant value throughout the positive half-cycle, as indicated by wave form b, upon the grid of the tube 16. The voltage output of tube 16 is of substantially or approximately square form, depending upon the characteristics of the input voltage, and the output voltage of the multivibrator is of square form, as indicated graphically by curve d.

This square wave voltage is impressed across the frequency meter terminals 1, 2, and is converted to a series of sharply peaked voltage pulses, as indicated by curve e, which are applied to the grid of tube V1. Each positive voltage input to tube V1 renders the normally blocked tube V1 conductive for a short interval which is determined by the values of the condenser C and resistor R. The tube V1 is normally non-conductive as the positive potential impressed upon its grid from the anode of tube V2, through the resistor 5 and resistor 4, is less than the negative bias developed by the cathode resistor 6 when the tube V2 is conducting. The grid of tube V1 is momentarily driven to a positive potential by the positive peak of the input voltage e, and the resultant conduction through the tube imposes a negative impulse on the grid of tube V2 through the condenser C. The tube V2 is thereby blocked, but the original resting charge on the condenser C flows off through the resistor R until the grid-cathode voltage of tube V2 rises to the value at which the tube conducts sufficiently to cut-off tube V1 again through resistors 5 and 4. The values of condenser C and resistor R are so selected that conduction through tube V1 is blocked momentarily between successive positive voltage peaks of all frequencies up to a critical value which is slightly more than the maximum frequency in each measuring range.

A series of positive voltage pulses applied to the grid of tube V1 therefore establishes a series of anode current pulses of square wave form, as shown by the curve f, which flows through the measuring instrument 9, and the average current is a linear function of the frequency of the positive voltage pulses up to substantially the critical frequency at which triode V2 remains continuously blocked by the succession of voltage pulses. The magnitude of the successive current pulses is independent of the amplitude of the signal voltage impressed across the input terminals 13, 17, and is also independent of fluctuations in the energizing potentials which preferably are developed from the usual alternating current power lines by "power pack" or rectifier-filter assembly, not shown. Tests on one embodiment of the invention showed complete independence of input signal amplitude between the limits of 0.5 and 100 volts, root mean square, and of line voltage variations of from 90 to 130 volts. The same frequency measuring apparatus exhibited a high degree of linearity between instrument current and frequency from 10 cycles per second to 100 kilocycles per second; decade-related measuring ranges being selected by switching values of condenser C in decade steps.

This linear relation between frequency and average instrument current is of considerable practical value as high measuring accuracy may be had with measuring instruments 9 having preprinted scales of uniform or logarithmic graduations of frequency. Another advantage of the invention is that the instrument is protected from overloads by an appropriate choice of tubes V1, V2 and associated circuit constants to limit the maximum current which can flow through the instrument.

As noted above, some or all of the equipment for developing a square voltage wave input to the measuring circuit per se may be omitted in special cases in which the circuit or apparatus under investigation provides a square voltage wave which may be impressed across the terminals 1, 2. The invention is not limited in its application to the measuring of the frequency of the current developed by or flowing in an electrical circuit. The measuring circuit may be employed as a tachometer to register the linear or rotary speed of a conveyor belt or a shaft which actuates a switch to impose voltage pulses on the terminals 1, 2 or 13, 17, respectively.

It has been proposed to employ electronic multivibrators in frequency measuring apparatus but it is broadly new, so far as I am now aware, to force the normally blocked tube of a single shot multivibrator or "flip-flop" circuit into cyclic conduction in synchronism with an alternating or pulsating signal voltage, and to determine the frequency of the signal voltage by measuring the average anode current of the normally non-conductive tube of the multivibrator system.

It is therefore to be understood that the invention is not limited to the circuit arrangements and apparatus as herein shown and described, and that various changes and modifications which may occur to those skilled in the art fall within the spirit and scope of the invention as set forth in the following claims.

I claim:

1. In a frequency meter, a pair of thermionic tubes each including an anode and a grid cooperating with a cathode, energizing circuits for said tubes including a common cathode resistor, cross-connections between the anode of each tube and the grid of the other tube to condition said tubes for single shot multivibrator operation, a resistor connected between grid and cathode of one tube to constitute means normally biasing that tube for conduction, the cross-connection from the anode of that tube to the grid of the other tube being a resistor, a bias resistor connected between the grid of said other tube and the anode end of said cathode resistor, whereby the other tube is normally non-conductive, said cross-connections comprising a condenser between the anode of the normally non-conductive tube and the grid of the normally conductive tube, the time-constant of the multivibrator operation being determined primarily by said condenser and said biasing resistor, a current measuring instrument in the anode circuit of said normally non-conductive tube, and an input circuit for impressing cyclic voltage pulses of the frequency to be measured upon the grid of one of said tubes whereby the average anode current through said instrument varies with the frequency to be measured.

2. In a frequency meter, a pair of thermionic tubes each including an anode and a grid cooperating with a cathode, energizing circuits for said tubes including a common cathode bias resistor, cross-connections between the anode of each tube and the grid of the other tube to condition said tubes for single shot multivibrator operation, a resistor connected between the grid and cathode of one tube to constitute means normally biasing that tube for conduction, a resistance connected between the grid of the other tube and the end of said cathode resistor remote from said cathodes; said cross-connections including a resistance connecting the anode of the normally conductive tube to the grid of the other tube and a condenser connecting the anode of said other tube to the grid of the normally conductive tube, whereby the other tube is normally non-conductive, a current measuring instrument in the anode circuit of said normally non-conductive tube, and an input circuit for impressing a cyclic positive voltage of the frequency to be measured upon the grid of the normally nonconductive tube, whereby the average anode current through said instrument varies with the frequency to be measured.

PHILBROOK CUSHING.

REFERENCES CITED

The following references are of record in the file of this patent:

UNITED STATES PATENTS

| Number | Name | Date |
|---|---|---|
| 2,260,933 | Cooper | Oct. 28, 1941 |
| 2,352,082 | De Rosa | June 20, 1944 |
| 2,366,076 | Wilbur | Dec. 26, 1944 |

OTHER REFERENCES

Gingrich et al., "A Direct Counting Rate Meter," Review of Sci. Inst., December 1936, pages 450–456.

Lenihan, "Pulse Generation," Electronic Engineering, March 1944, pages 408–411.

Gootee, "Multivibrators," Radio News, March 1947, pages 16–19, 27, 28.